US012591866B2

(12) United States Patent
Beaty et al.

(10) Patent No.: US 12,591,866 B2
(45) Date of Patent: Mar. 31, 2026

(54) SYSTEM FOR OFF-CHAIN MANAGEMENT, DISTRIBUTION AND AUDITING OF DECENTRALIZED CRYPTOCURRENCY

(71) Applicant: RedCritter Corp., Flower Mound, TX (US)

(72) Inventors: Robert M. Beaty, Flower Mound, TX (US); Randy M. Whelan, Coppell, TX (US); Erika D. Lambert, Flower Mound, TX (US); David R. Jenness, Lantana, TX (US); James L. Rockett, Jr., Carrollton, TX (US)

(73) Assignee: RedCritter Corp., Flower Mound, TX (US)

( * ) Notice: Subject to any disclaimer, the term of this patent is extended or adjusted under 35 U.S.C. 154(b) by 250 days.

(21) Appl. No.: 17/355,738

(22) Filed: Jun. 23, 2021

(65) Prior Publication Data

US 2022/0414622 A1      Dec. 29, 2022

(51) Int. Cl.
| | |
|---|---|
| *G06Q 20/06* | (2012.01) |
| *G06Q 20/10* | (2012.01) |
| *G06Q 20/36* | (2012.01) |

(52) U.S. Cl.
CPC ......... *G06Q 20/0658* (2013.01); *G06Q 20/10* (2013.01); *G06Q 20/363* (2013.01); *G06Q 20/3674* (2013.01)

(58) Field of Classification Search
CPC .. G06Q 20/0658; G06Q 20/10; G06Q 20/363; G06Q 20/3674
See application file for complete search history.

(56) References Cited

U.S. PATENT DOCUMENTS

| | | | |
|---|---|---|---|
| 10,373,158 B1* | 8/2019 | James | G06Q 40/04 |
| 2013/0262309 A1* | 10/2013 | Gadotti | G06Q 20/3274 |
| | | | 705/44 |

(Continued)

OTHER PUBLICATIONS

Rosenfeld, Meni. "Overview of Colored Coins." (2012). (Year: 2012).*

(Continued)

*Primary Examiner* — John W Hayes
*Assistant Examiner* — Taylor S Rak
(74) *Attorney, Agent, or Firm* — Kirton McConkie; Brian Tucker

(57) ABSTRACT

A system for off-chain management, distribution and auditing of decentralized cryptocurrency is provided. The system enables an organization to mint off-chain, centrally controlled tokens for internal distribution within the organization. The system allows these tokens to be assigned an underlying value in a cryptocurrency and to be associated with distribution rules and withdrawal rules. When a token is distributed to an employee, it does not guarantee that the employee will receive the underlying value in the cryptocurrency. Instead, the token represents the employee's ability to withdraw up to the assigned underlying value in the cryptocurrency, which the organization can approve, adjust or deny. When the organization approves an employee's withdrawal of a token's underlying value, the system can manage the distribution of the token's underlying value to the employee's cryptocurrency wallet and can provide functionality for tracking, reporting and auditing such transactions.

20 Claims, 14 Drawing Sheets

(56) References Cited

U.S. PATENT DOCUMENTS

| 2015/0324764 | A1* | 11/2015 | Van Rooyen | ...... | G06Q 20/0655 |
| | | | | | 705/69 |
| 2017/0005804 | A1* | 1/2017 | Zinder | ................ | G06F 21/6254 |
| 2017/0372300 | A1* | 12/2017 | Dunlevy | .............. | G06Q 20/363 |
| 2019/0050832 | A1* | 2/2019 | Wright | .................. | H04L 9/3066 |
| 2020/0005281 | A1* | 1/2020 | Patel | .................. | G06Q 20/3255 |
| 2020/0234277 | A1* | 7/2020 | Dabney | .............. | G06Q 20/3224 |
| 2021/0374791 | A1* | 12/2021 | Kim | ................... | G06Q 20/3829 |

OTHER PUBLICATIONS

"What is the Raiden Network?", 2018, Raiden Network, https://raiden.network/101.html (Year: 2018).*

* cited by examiner

SYSTEM FOR OFF-CHAIN MANAGEMENT, DISTRIBUTION AND AUDITING OF DECENTRALIZED CRYPTOCURRENCY

CROSS-REFERENCE TO RELATED APPLICATIONS

N/A

BACKGROUND

Many organizations have employees that would like to receive some compensation in the form of cryptocurrency such as Bitcoin or Ethereum. However, the decentralized nature of these cryptocurrencies make it very difficult for organizations to administer, manage, monitor and report cryptocurrency transactions with their employees. As a result, most organizations forego the use of cryptocurrencies to compensate or reward their employees.

BRIEF SUMMARY

The present invention extends to a system for off-chain management, distribution and auditing of decentralized cryptocurrency and to related methods and computer program products. The system enables an organization to mint off-chain, centrally controlled tokens for internal distribution within the organization. The system allows these tokens to be assigned an underlying value in a cryptocurrency and to be associated with rules defining who can distribute the tokens, when the tokens can be distributed, how many tokens can be distributed, how many tokens an employee or group can receive and when and how individuals can withdraw the tokens.

When a token is distributed to an employee, it does not guarantee that the employee will receive the underlying value in the cryptocurrency. Instead, the token represents the employee's ability to withdraw up to the assigned underlying value in the cryptocurrency, which the organization can approve, adjust or deny. When the organization approves an employee's withdrawal of a token's underlying value, the system can manage the distribution of the token's underlying value to the employee's cryptocurrency wallet and can provide functionality for tracking, reporting and auditing such transactions.

In some embodiments, the present invention may be implemented as a method for off-chain management, distribution and auditing of decentralized cryptocurrency. An API server can receive a request to create a batch of tokens for an organization. The request can identify a value of the tokens in the batch. The API server can access a cryptocurrency wallet that stores cryptocurrency for the organization to determine whether the cryptocurrency wallet stores sufficient cryptocurrency for the value of the tokens in the batch. In response to determining that the cryptocurrency wallet stores sufficient cryptocurrency for the value of the tokens in the batch, the API server can create the batch of tokens, including associating the value of the tokens in the batch with the cryptocurrency for the organization that is stored in the cryptocurrency wallet.

In some embodiments, the present invention may be implemented as computer storage media storing computer executable instructions which when executed implement a method for off-chain management, distribution and auditing of decentralized cryptocurrency. An API server may receive a request to create a batch of tokens for an organization. The request may identify a value of the tokens in the batch. The API server may create the batch and associate the batch with a cryptocurrency wallet that stores cryptocurrency for the organization. The API server may receive a request from a first employee of the organization to issue a first token in the batch to a second employee of the organization. The API server may then issue the first token to the second employee. The API server may receive a request from the second employee to withdraw the first token. In response to the request from the second employee to withdraw the first token, the API server may cause an amount to be withdrawn from the cryptocurrency wallet that stores cryptocurrency for the organization and deposited into a cryptocurrency wallet of the second employee.

In some embodiments, the present invention may be implemented as a system for off-chain management, distribution and auditing of decentralized cryptocurrency. The system may include an API server, storage and user interfaces by which employees of an organization interface with the API server. The API server may be configured to: access a cryptocurrency wallet that stores cryptocurrency for the organization; receive requests from the employees to create batches of tokens; associate the batches of tokens with the cryptocurrency wallet; maintain data structures that define which of the tokens in the batches have been issued to the employees; maintain data structures that define which of the tokens in the batches have been withdrawn by the employees; and for each of the tokens that are withdrawn by the employees, access the cryptocurrency wallet that stores cryptocurrency for the organization to withdraw a value of the token and access a cryptocurrency wallet of the respective employee to deposit the value of the token.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "organization" will be used to represent any company, governmental entity, educational entity, religious entity, or other type or organization that may use a system that is configured in accordance with one or more embodiments of the present invention. The term "employee" will be used to represent an individual that may work for, be contracted with or otherwise participate in an organization. The term "admin" will be used to represent an employee that administrates a system for an organization. Employees and admins may be considered users of the system.

Figure 1:
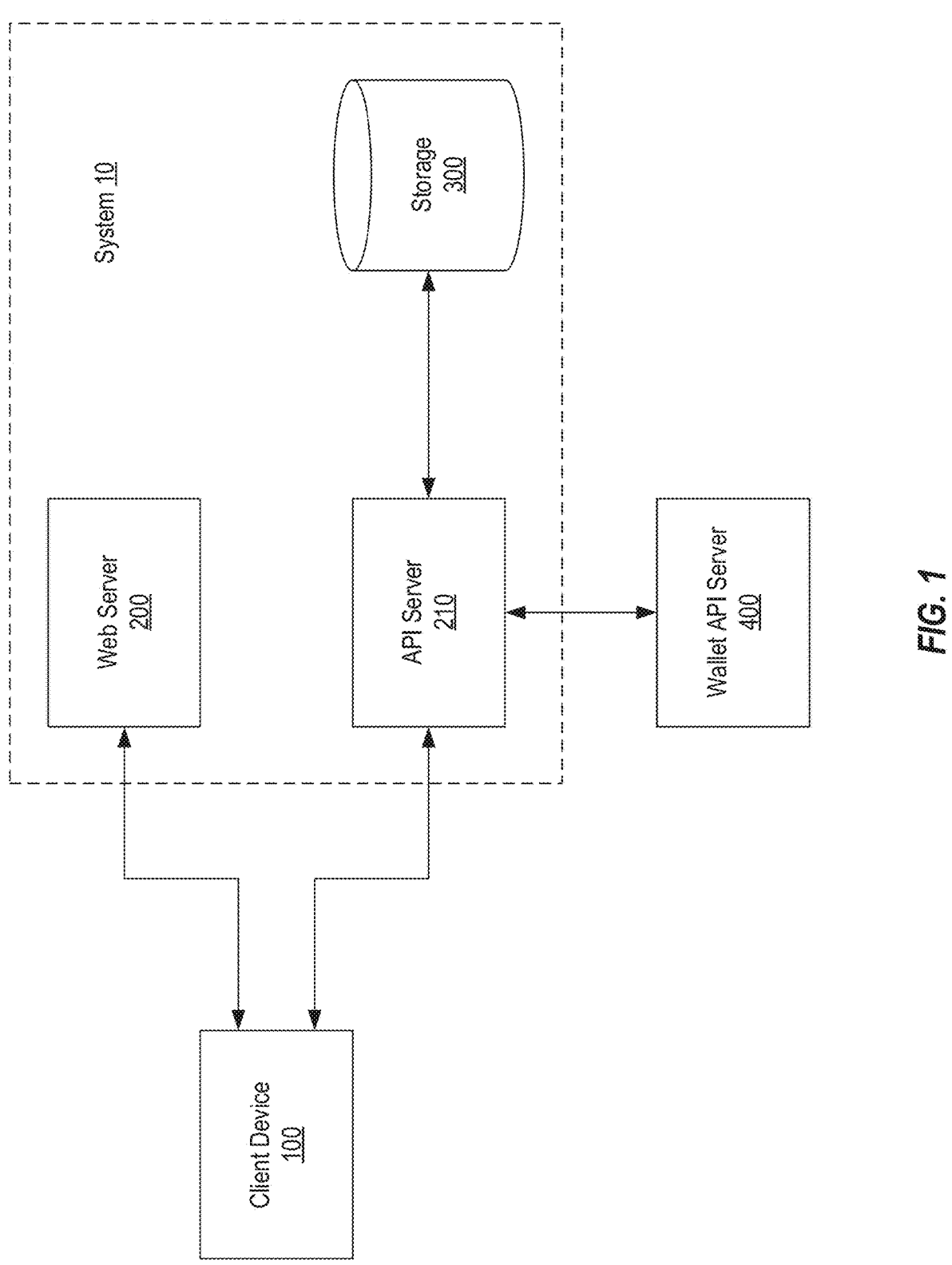
FIG. 1 illustrates an example computing environment in which one or more embodiments of the present invention may be implemented.

FIG. 1 provides an example of a computing environment in which embodiments of the present invention may be implemented. This environment includes a system 10 for off-chain management, distribution and auditing of decentralized cryptocurrency. System 10 may include a web server 200, an API server 210 and storage 300. Web server 200 can be configured to provide web content to client devices 100 (only one of which is shown) by which users may access functionality of system 10. For example, web server 200 can provide various websites, web applications or other browser-based content that can be displayed on client devices 100. However, web server 200 could be replaced with or work in conjunction with client-side applications (e.g., a mobile or desktop app). Accordingly, system 10 can be viewed as providing user interfaces (e.g., webpages, mobile application interfaces, etc.) by which a user can access functionality provided by API server 210.

API server 210 can provide a number of APIs by which client devices 100 can interface with system 10. For example, content provided by web server 200 to client devices 100 can include API calls for interfacing with API server 210 to perform the functionality described below. In this context, the term API should be construed broadly as encompassing any type of communication that is suitable for performing the functionality described herein. Likewise, the term API server should be construed as encompassing any service that is capable of performing the functionality described herein.

Storage 300 can represent any type or number of storage mechanisms for storing the data structures that system 10 may use to provide the functionality described below. For example, storage 300 may include relational databases, object storage, indexes, file systems, etc. Any or all of web server 200, API server 210 and storage 300 can be hosted in the cloud, implemented on dedicated hardware or provided in any other suitable manner.

Client device(s) 100 can represent any computing device that a user may use to interface with system 10. For example, a client device 100 may be a desktop, laptop, tablet, smart phone, etc. In typical implementations, there may be many organizations that use system 10, and therefore, there may be many client devices 100 that users associated with such organizations use to access system 10.

Wallet API server(s) 400 can represent API servers for accessing any third-party cryptocurrency wallets that system 10 is configured to support. As one example, if users of system 10 use Coinbase wallets to store their cryptocurrency, wallet API server 400 could be an API server for accessing Coinbase wallets. As another example, wallet API server 400 could represent an API of a cryptocurrency custodial service such as the Celsius API.

Figure 2:
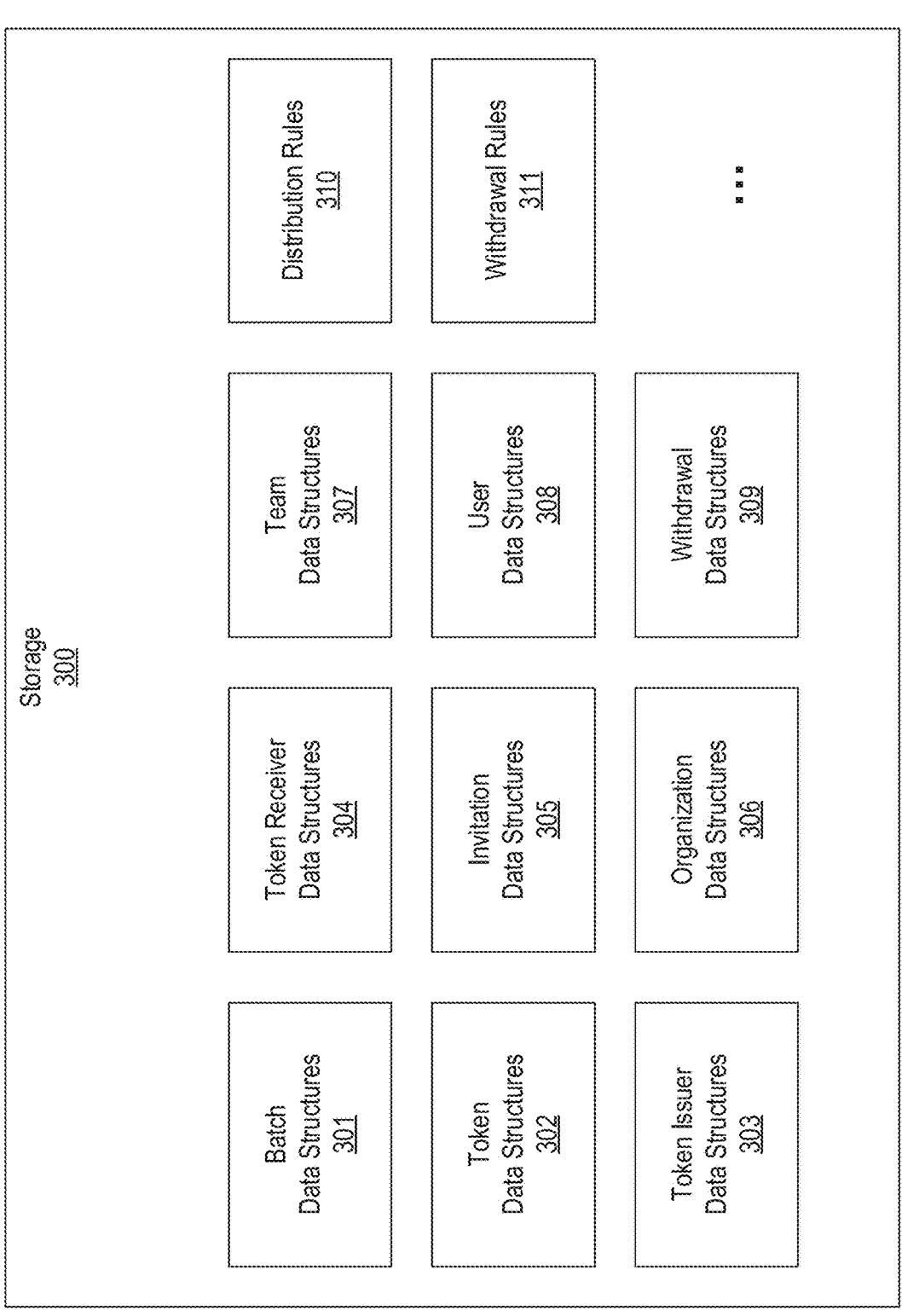
FIG. 2 provides an example of various data structures that may be used in one or more embodiments of the present invention.

FIG. 2 provides an example of various data structures that system 10 may maintain in storage 300 for use in implementing one or more embodiments of the present invention. As an overview, batch data structures 301 may be used to define each batch of tokens that organizations have created within system 10. Token data structures 302 may be used to define individual tokens. Token issuer data structures 303 may be used to define users that can issue tokens in a batch. Token receiver data structures 304 may be used to define users that can receive tokens in a batch. Invitation data structures 305 may be used to define invitations that organizations have sent. Organization data structures 306 may be used to define organizations. Team data structures 307 may be used to define teams or other groups of users within an organization. User data structures 308 may be used to define users within an organization. Withdrawal data structures 309 may be used to define withdrawals that users have made within system 10. Storage 300 may also maintain distribution rules 310 which define rules governing the distribution of tokens within system 10 and withdrawal rules 311 which define rules governing the withdrawal of tokens within system 10.

Figure 3:
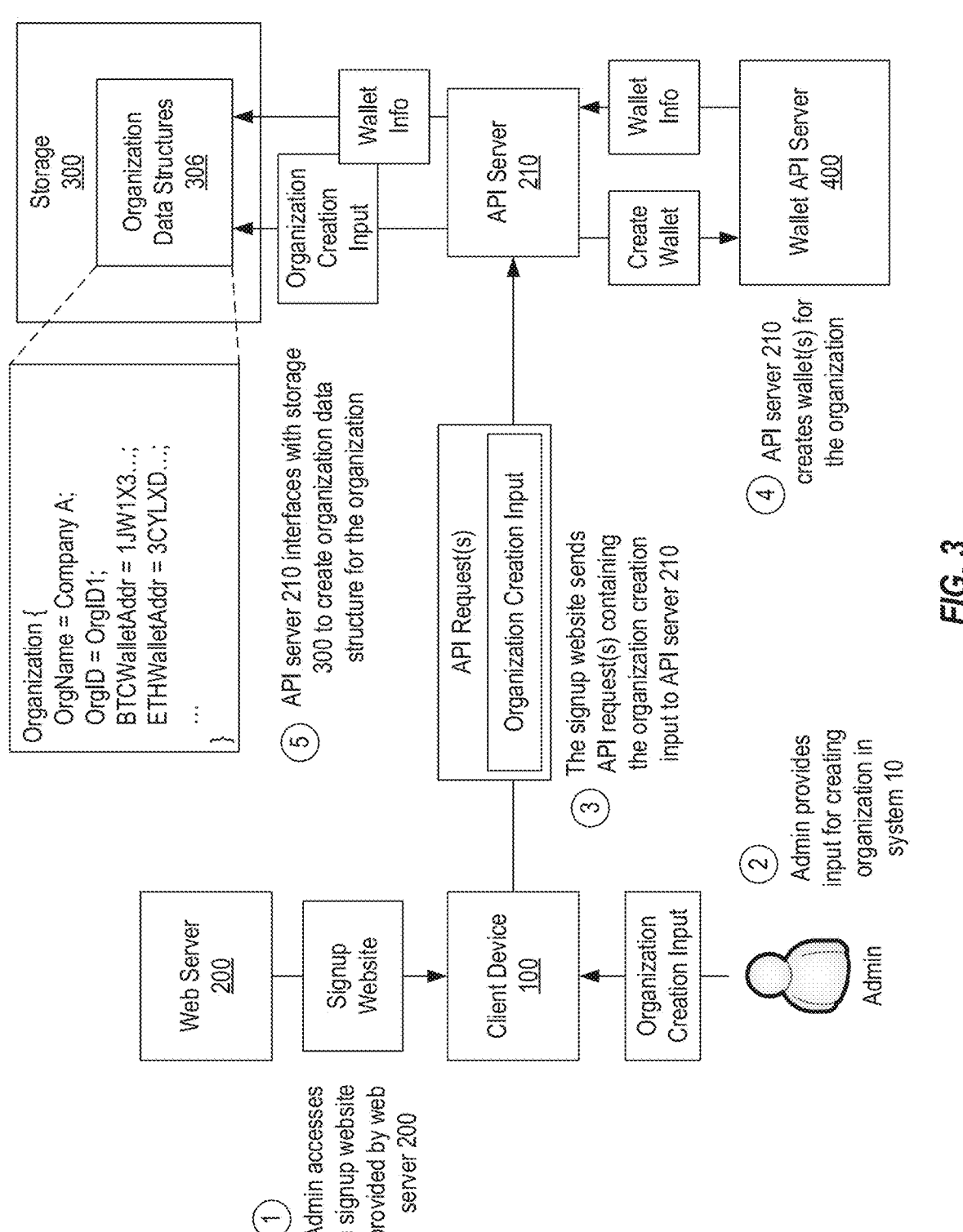
FIG. 3 provides an example of how a system may create one or more wallets for use by an organization in one or more embodiments of the present invention.

FIG. 3 provides an example of functionality that system 10 may perform when an organization signs up to use system 10. In step 1, it is assumed that an admin of an organization accesses a signup website provided by web server 200 (or a corresponding mobile application). In step 2, the admin can provide input for creating an organization in system 10. For example, the admin can input the name of the organization, contact information, login credentials, etc. and, in some embodiments, may specify one or more types of cryptocurrencies that the organization would like to use (e.g., Bitcoin and/or Ethereum). In step 3, the signup website can send one or more API requests containing the received organization creation input to API server 210. In step 4, API server 210 can interface with wallet API server(s) 400 to create a cryptocurrency wallet for the organization. In step 5, API server 210 can interface with storage 300 to create an organization data structure for the organization. For example, an entry could be added to organization data structures 306 which defines/identifies the organization's name, contact information, login credentials, wallet information (e.g., an address for accessing a Bitcoin wallet and/or an Ethereum wallet that system 10 created for the organization), etc. Although not shown, after the wallet(s) have been created for the organization, API server 210 can return or present the wallet information (e.g., the wallet address(es)) to the organization to allow the organization to make deposits.

Figure 4A:
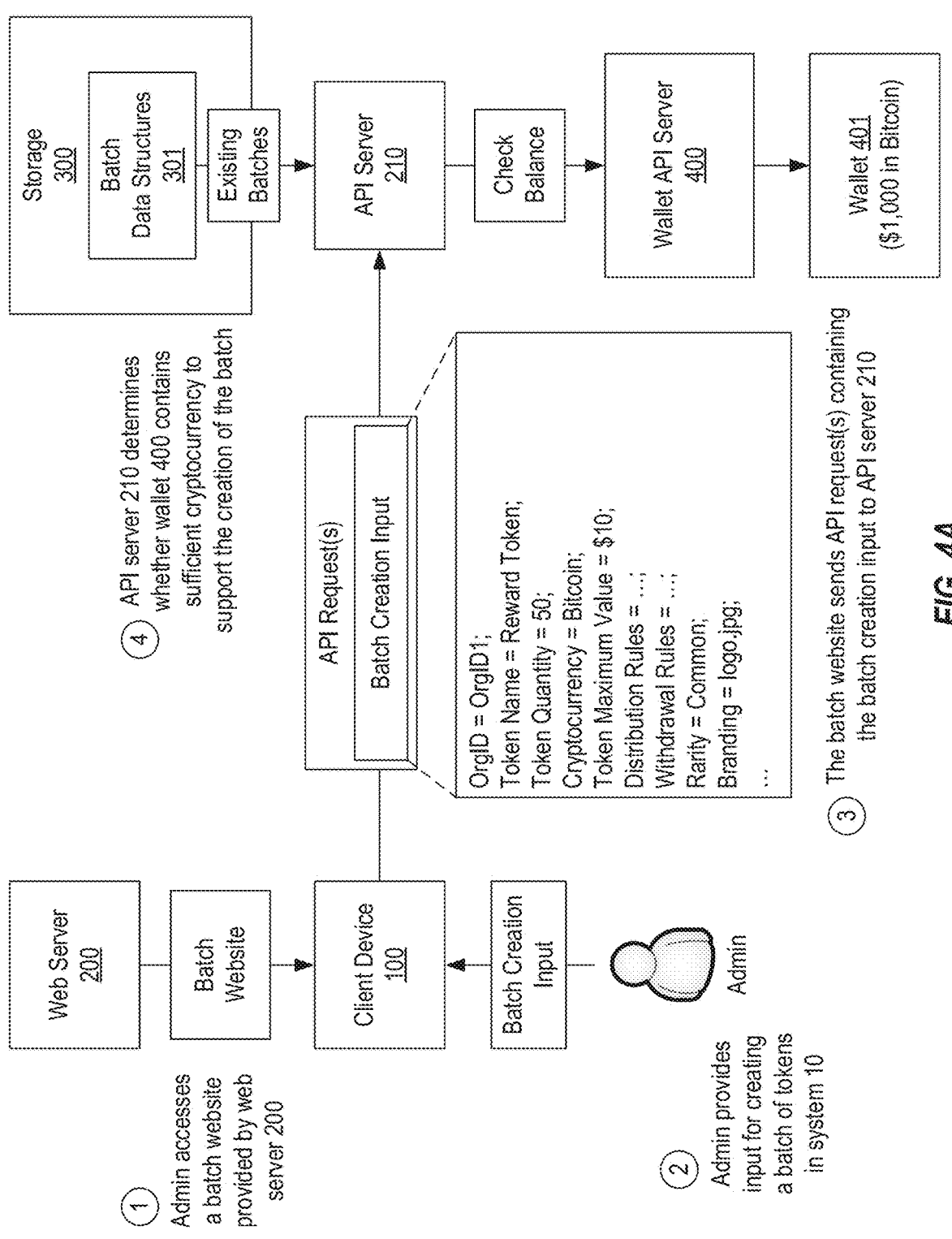
FIGS. 4A and 4B provide an example of how a system may enable an organization to mint tokens in accordance with one or more embodiments of the present invention.
Figure 4B:
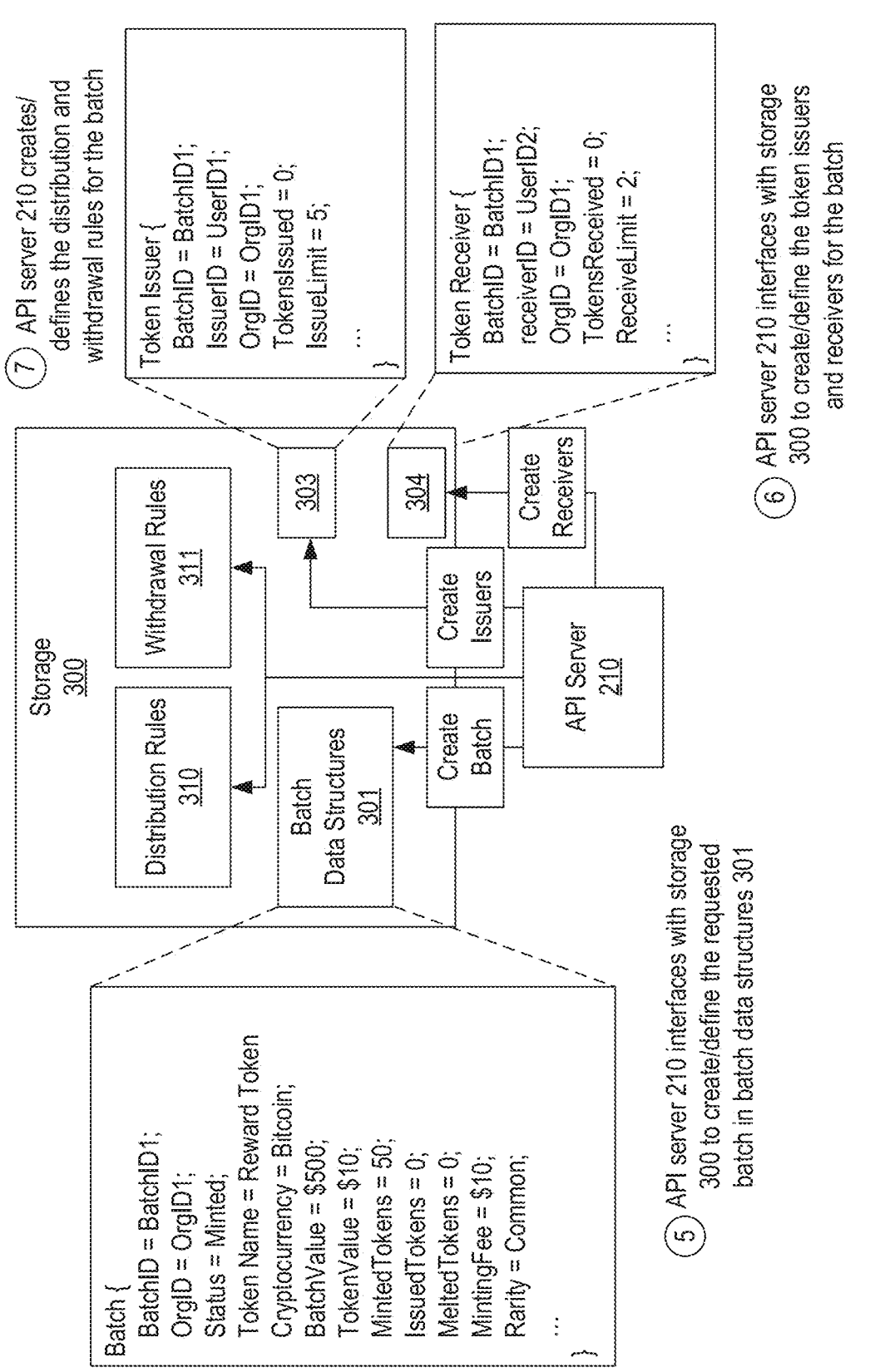

FIGS. 4A and 4B provide an example of how system 10 can enable the organization to mint tokens, or in other words, enable the organization to create batches of off-chain tokens that have an associated cryptocurrency and value. As shown in FIG. 4A, it is assumed that a wallet 401 has been created for the organization and that the organization has deposited $1,000 worth of Bitcoin into wallet 401. In step 1 shown in FIG. 4A, it is assumed that the admin accesses a batch website provided be web server 200, and that, in step 2, the admin provides input for creating a batch of tokens. As shown, this input may include a name for the tokens in the batch (e.g., "Reward Token"), a quantity of tokens in the batch (e.g., 50), a cryptocurrency (e.g., Bitcoin), a maximum value for the tokens (e.g., $10), distribution rules (e.g., which employees or teams can distribute the tokens, how many tokens these employees or teams can distribute, when the tokens can be distributed, which employees or teams can receive the tokens, how many tokens the employees or teams can receive, etc.), withdrawal rules (e.g., when tokens can be withdrawn), a rarity (e.g., common, special, unique, etc.), branding (e.g., a logo to be displayed on the token), etc. In step 3, the batch website can send one or more API requests to API server 210 which include the batch creation input received from the admin and may also specify the organization's identifier. In step 4, API server 210 can determine whether wallet 401 contains sufficient cryptocurrency to support the creation of the requested batch. For example, API server 210 may query storage 300 to identify any batches that the organization has already minted (e.g., by using the OrgID to query batch data structures 301 for any batches associated with the OrgID) and then compare the value of any existing minted batches and the batch to be minted to the balance in wallet 401. In some embodiments, API server 210 may also consider any minting fee that is required for creating a batch of tokens in this comparison. In the depicted example, it is assumed that Company A (OrgID1) has not yet minted any batches and therefore, the $1,000 balance in wallet 401 is sufficient to mint a batch with a total value of $500.

Turning to FIG. 4B, and based on the assumption API server 210 determines that wallet 401 has sufficient funds to support the creation of the requested batch, in step 5, API server 210 can interface with storage 300 to create/define the requested batch in batch data structures 301. For example, a batch can be defined within batch data structures 301 by specifying a batchID to uniquely identify the batch within system 10, the OrgID of the requesting organization, a status for the batch (e.g., reserved, minted, etc.), the token name, the cryptocurrency, the batch value (e.g., the token value multiplied by the number of tokens), the token value, the number of tokens minted/created, the number of tokens issued (which would initially be 0), the number of tokens melted (which would also initially be 0), a minting fee, the rarity, etc.

In step 6, API server 210 can interface with storage 300 to create/define token issuer(s) in token issuer data structures 303 and the token receiver(s) in token receiver data structures 304 in accordance with the distribution rules the admin specified in the batch creation input. For example, for any user that the admin identifies as being authorized to issue tokens in the requested batch, API server 210 can create an entry in token issuer data structures 303 that defines the batchID, an issuerID (e.g., the user ID of the user within system 10), the OrgID, a total number of tokens in the batch that the token issuer has issued, a total number of tokens in the batch that the token issuer is authorized to issue, etc. Also, for any user that the admin identifies as being authorized to receive tokens in the requested batch, API server 210 can create an entry in token receiver data structures 304 that defines the batchID, a receiverID (e.g., the user ID of the user within system 10), the OrgID, a total number of tokens in the batch that the token receiver has received, a total number of tokens in the batch that the token receiver is authorized to received, etc.

In step 7, API server 210 can also create the distribution and withdrawal rules for the batch (or associate the batch with existing distribution and withdrawal rules) in storage 300 in accordance with the batch creation input. In some embodiments, a withdrawal rule for the batch may be selected from a plurality of available withdrawal rules such as: withdrawal after a specified date, withdrawal after a specified duration of time after a token is issued, withdrawal during a specified range of time, withdrawal before a specified date, etc. In some embodiments, the applicable withdrawal rule(s) could be defined within the batch's entry in batch data structures 301.

Although not represented in the figures, API server 210 may also create a digital representation of the tokens in the batch. For example, API server 210 may convert any provided logo or other image into a 3d texture that can be applied to one side of the digital representation of the tokens and can also generate a 3d texture that includes the token name, token value and cryptocurrency that can be applied to the other side of the digital representation of the tokens. This digital representation could be stored in storage 300 and associated with the batch's entry in batch data structures 301 or otherwise associated with the tokens in the batch.

Figure 5A:
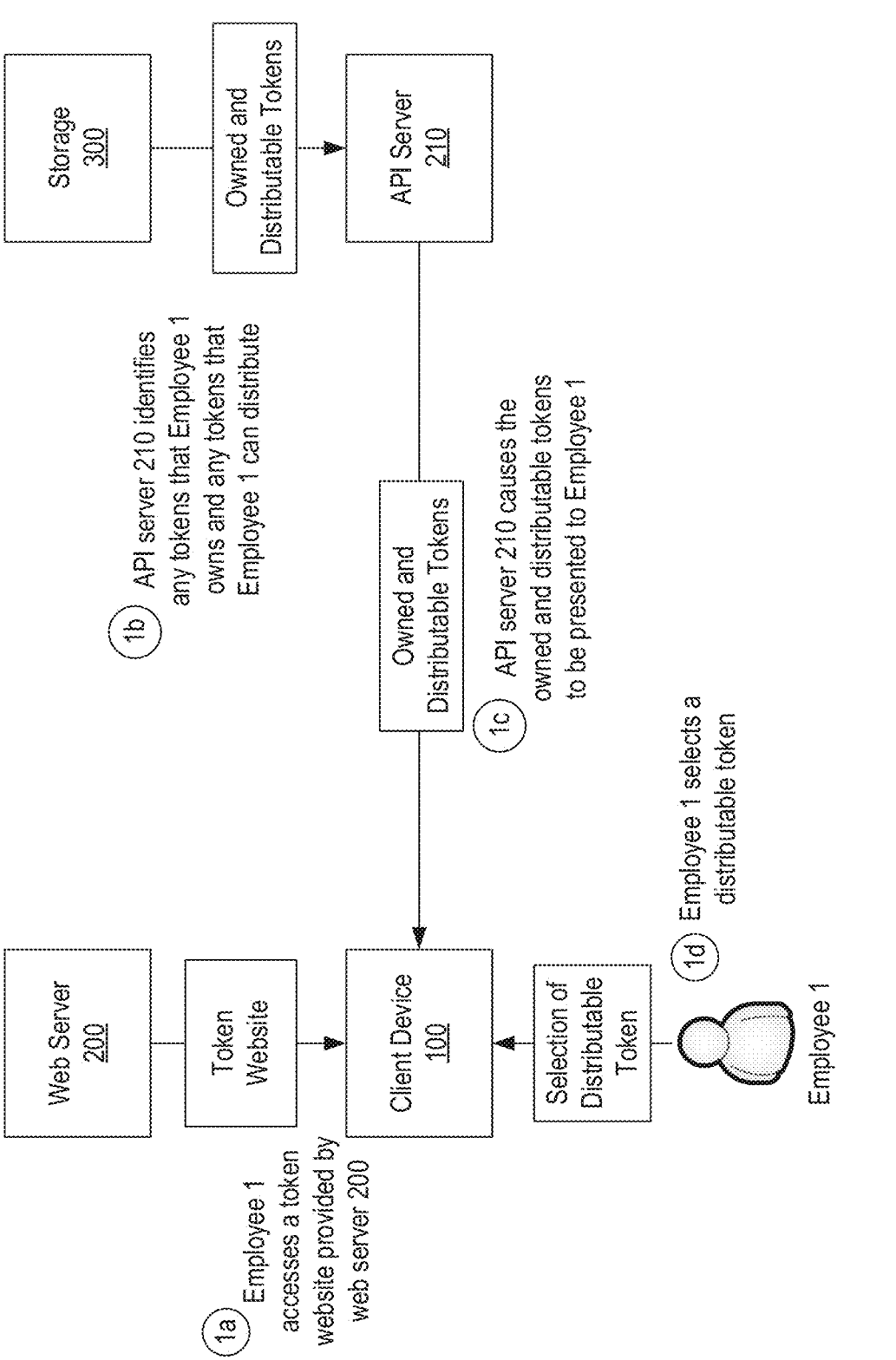
FIGS. 5A-5D provide an example of how a system may enable a user to distribute a token to another user in accordance with one or more embodiments of the present invention.

FIGS. 5A-5D provide an example of how system 10 can enable a user to distribute a token to another user within an organization. FIG. 5A represents steps that can be performed for a token issuer, who is assumed to be Employee 1. It is assumed that, in step 1a, Employee 1 accesses a token website provided by web server 200. For example, Employee 1 could log in with his or her credentials within system 10. In step 1b, API server 210 can identify any tokens that Employee 1 owns (i.e., tokens that have been issued to Employee 1) and any tokens that Employee 1 is authorized to distribute (e.g., tokens in batches for which Employee 1 was identified as a token issuer). In some embodiments, owned tokens may also be distributable tokens (e.g., tokens in some batches may be distributable in a peer-to-peer fashion as opposed to only being distributable once by a token issuer). In some embodiments, API server 210 could identify Employee 1's owned and distributable tokens by querying token data structures 302 and token issuer data structures 303 respectively. In step 1c, API server 210 can cause the owned and distributable tokens (or only the distributable tokens) to be presented to Employee 1 such as within the token website. Then, in step 1d, Employee 1 can select one of the distributable tokens.

Figure 5B:
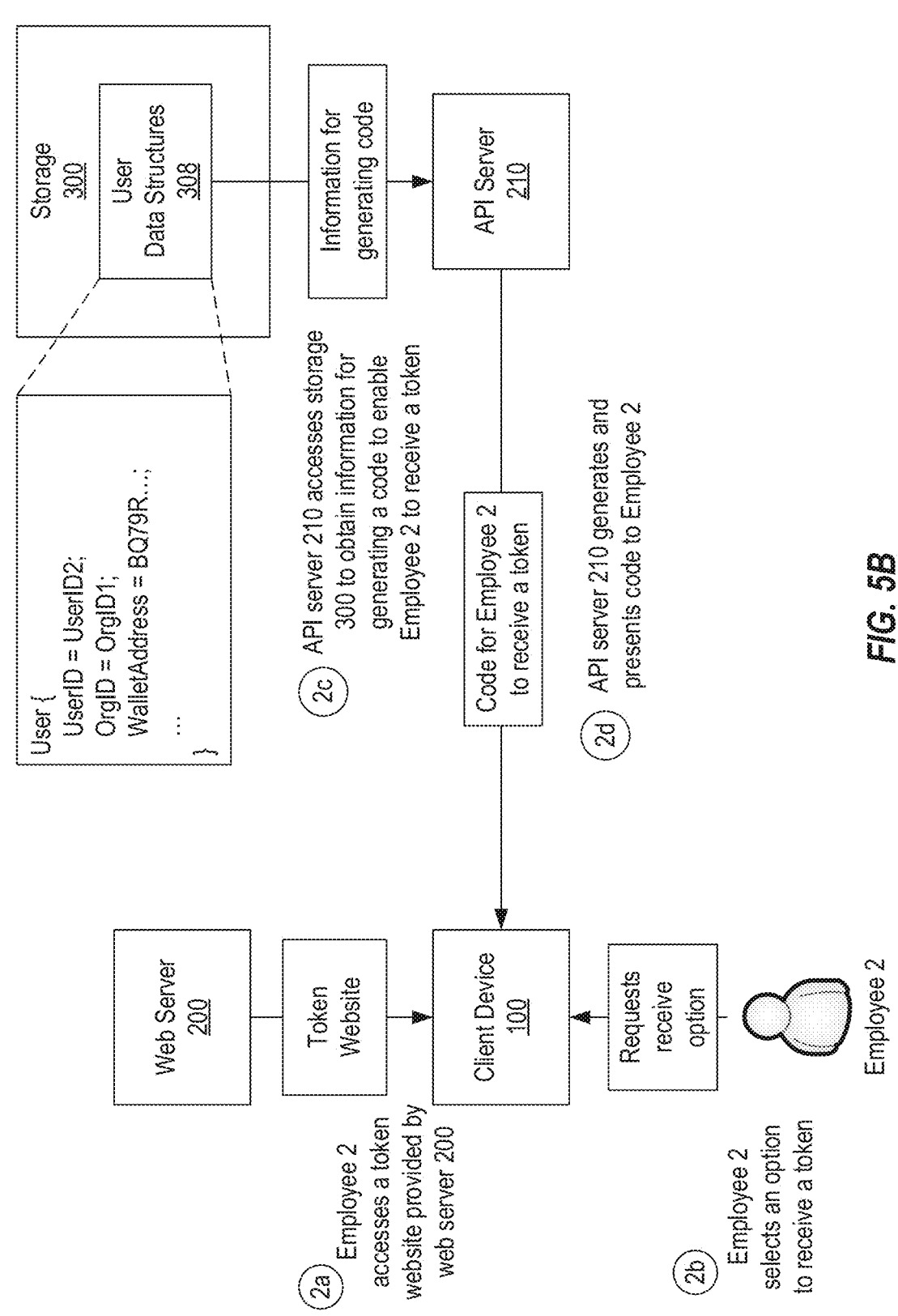

FIG. 5B represents steps that can be performed for a token receiver, who is assumed to be Employee 2. These steps can be performed in conjunction with those shown in FIG. 5A. In step 2a, it is assumed that Employee 2 accesses the token website which may include logging in or otherwise specifying his or her identity. In step 2b, Employee 2 selects an option to receive a token. For example, in some embodiments, the token website could present tokens that an employee owns, tokens that the employee can distribute, if any, and an option to receive a token from another user. In step 2c, and in response to Employee 2 selecting the option to receive a token, API server 210 can access storage 300 to obtain information for generating a code to enable Employee 2 to receive a token. For example, in some embodiments, an entry in user data structures 308 that defines Employee 2 can include a userID (which is assumed to be UserID2), the OrgID and an address of Employee 2's wallet (or wallets) in system 10. An employee's (or user's) wallet address within system 10 can be any identifier that uniquely identifies the wallet. In some embodiments, a wallet address could be formed by combining the OrgID and UserId. In any case, in step 2d, API server 210 can use the information it obtained in step 2c to create a code for Employee 2 to receive a token. In some embodiments, this code could be a QR code that can be displayed on client device 100. However, the code could be in the form of text for manual entry or any other form. As a result of this process, Employee 2's client device 100 may display a code that Employee 1 (or another user) can use to issue a token to Employee 2.

Figure 5C:
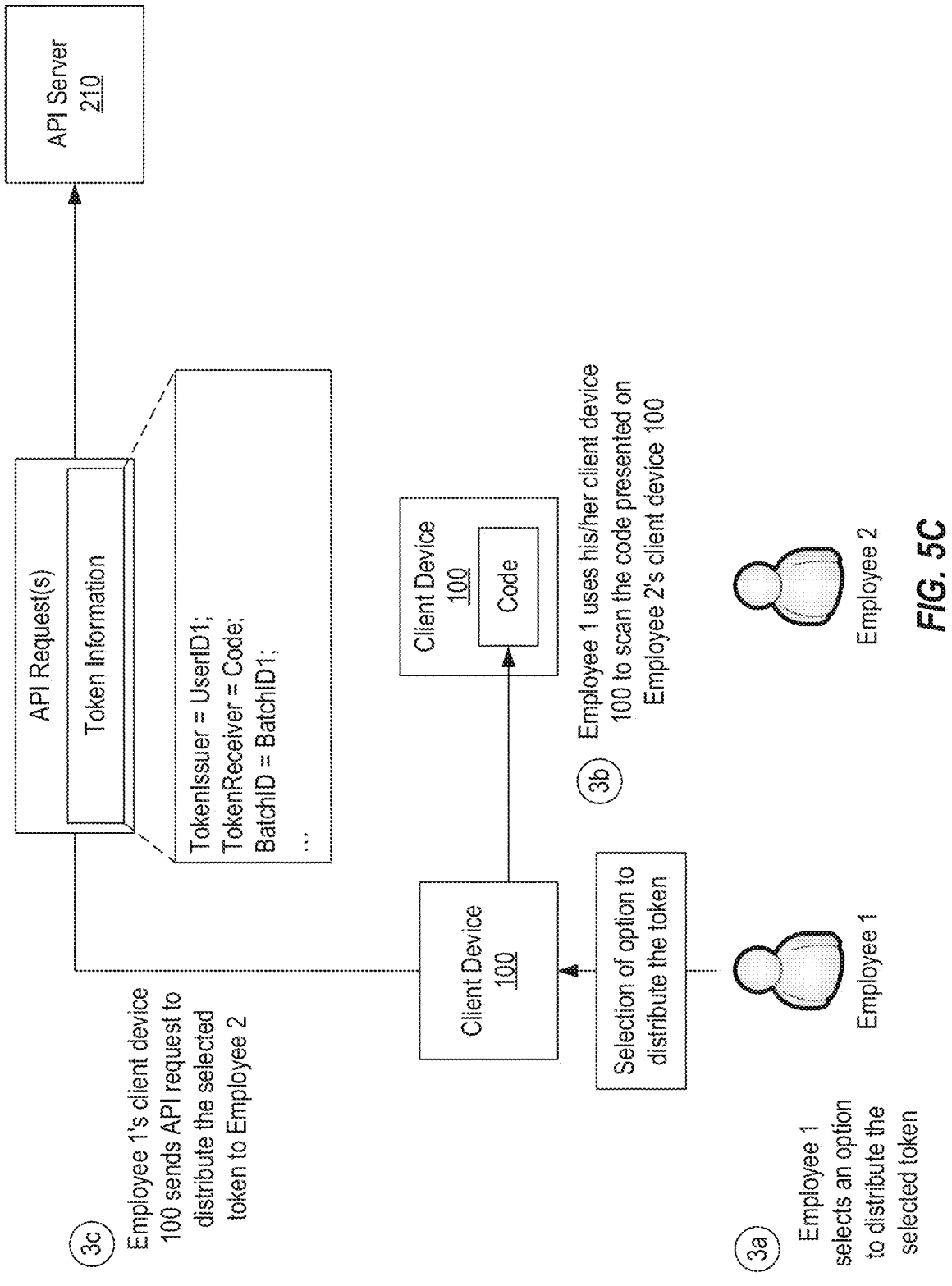

Turning to FIG. 5C, in step 3a which may be performed after Employee 1 selects a distributable token in step 1d, Employee 1 may select an option within the token website (or other interface) to distribute the selected token. In some embodiments, selecting this option may cause Employee 1's client device 100 to launch the camera or otherwise provide a means for capturing or entering a code. In step 3b, and assuming the code is displayed on Employee 2's client device 100 as a QR code, Employee 1 can use his or her client device 100 to scan the code. Alternatively, Employee 1 could manually enter the code. In step 3*c*, in response to capturing the code (or otherwise obtaining the code), the token website hosted on Employee 1's client device 100 can send one or more API requests to API server 210 containing token information. This token information may include an identification of the token issuer (e.g., Employee 1's userID within system 10 which is assumed to be UserID1), an identification of the token receiver (e.g., the code) and the batchID of the token to be issued (which could have been determined when Employee 1 selected a particular token).

Figure 5D:
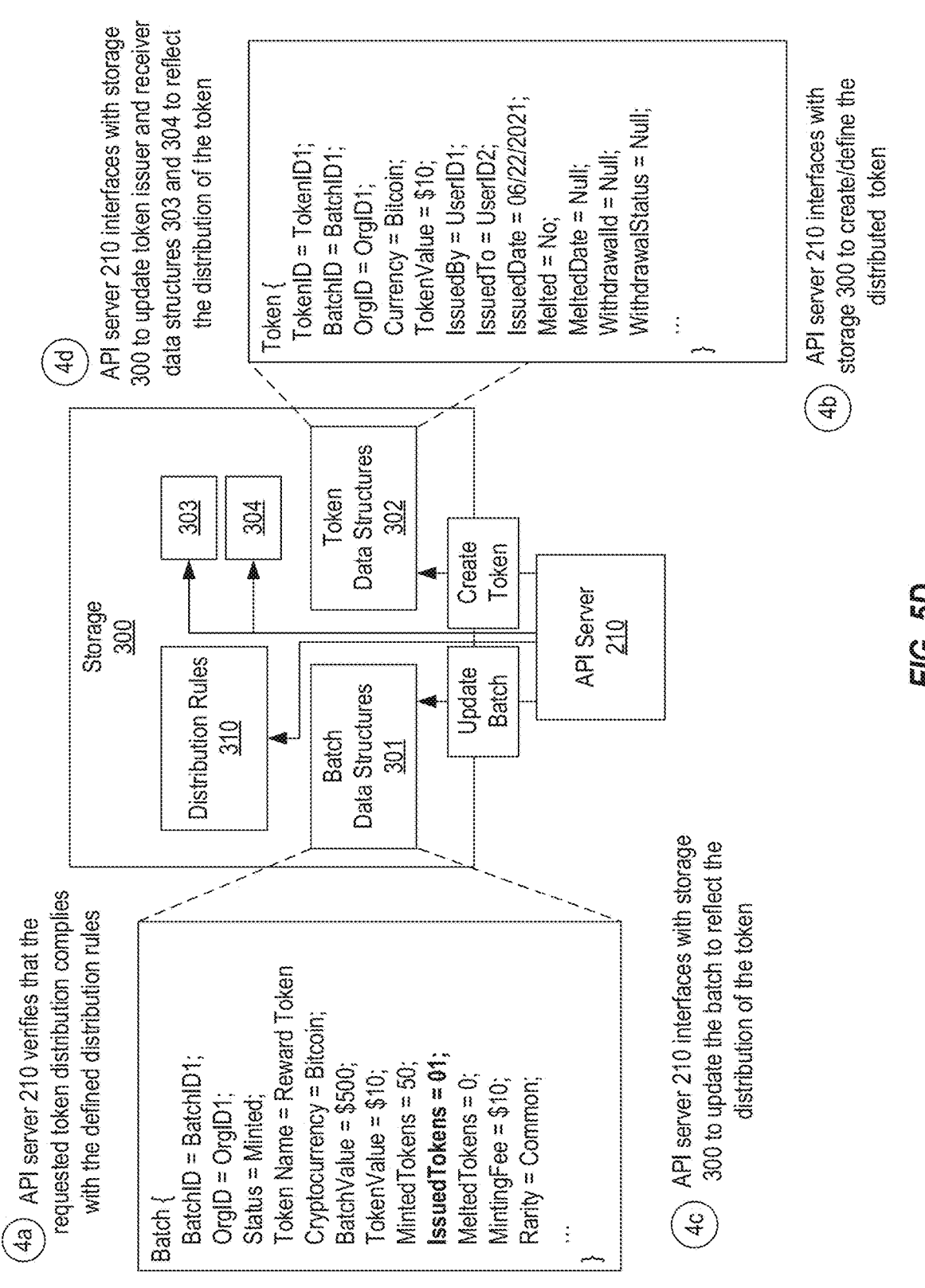

Turning to FIG. 5D, in step 4*a*, API server 210 can respond to the request to issue the token by first verifying that the requested token distribution complies with the distribution rules that were defined for tokens in the identified batch. For example, API server 210 may interface with storage 300 to access any applicable distribution rules 310. As another example, API server 210 could use the specified batchID to access the batch in batch data structures 301 to determine if the number of tokens issued is less than the number of tokens minted. As another example, API server 210 could access token issuer data structures 303 to verify that Employee 1 is authorized to distribute tokens in the identified batch and to determine whether the number of tokens in the batch that Employee 1 has issued is less than the number of tokens that Employee 1 is authorized to issue. As another example, API server 210 could use the code to identify Employee 2 and then access token receiver data structures 304 to verify that Employee 2 is authorized to receive tokens in the identified batch and to determine whether the number of tokens in the batch that Employee 2 has received is less than the number of tokens that Employee 2 is authorized to receive.

If API server 210 determines that the requested token distribution complies with the defined distribution rules, API server 210 can issue the token to Employee 2. For example, in step 4*b*, API server 210 can interface with storage 300 to create/define the token in token data structures 302. As shown, this may entail creating an entry that includes/defines a tokenID to uniquely represent the token in system 10, the batchID, the OrgID, the cryptocurrency and value for the token, an identification of the token issuer, an identification of the token receiver, a date the token was issued, whether the token has been melted, a date the token was melted, a withdrawal identification (e.g., a unique identifier created when the token is withdrawn), a withdrawal status, etc. Accordingly, token data structures 302 may include an entry for any token that has been issued.

As part of issuing the token to Employee 2, in step 4*c*, API server 210 may also update the respective batch in batch data structures 301. For example, API server 210 may increment the value of the issuedTokens field. In step 4*d*, API server 210 may similarly update the token issuer and token receiver entries in token issuer data structures 303 and token receiver data structures 304 respectively. Once API server 210 has completed the process of issuing the token to Employee 2, it may cause a confirmation to be presented to Employee 1 and/or Employee 2.

Figure 6A:
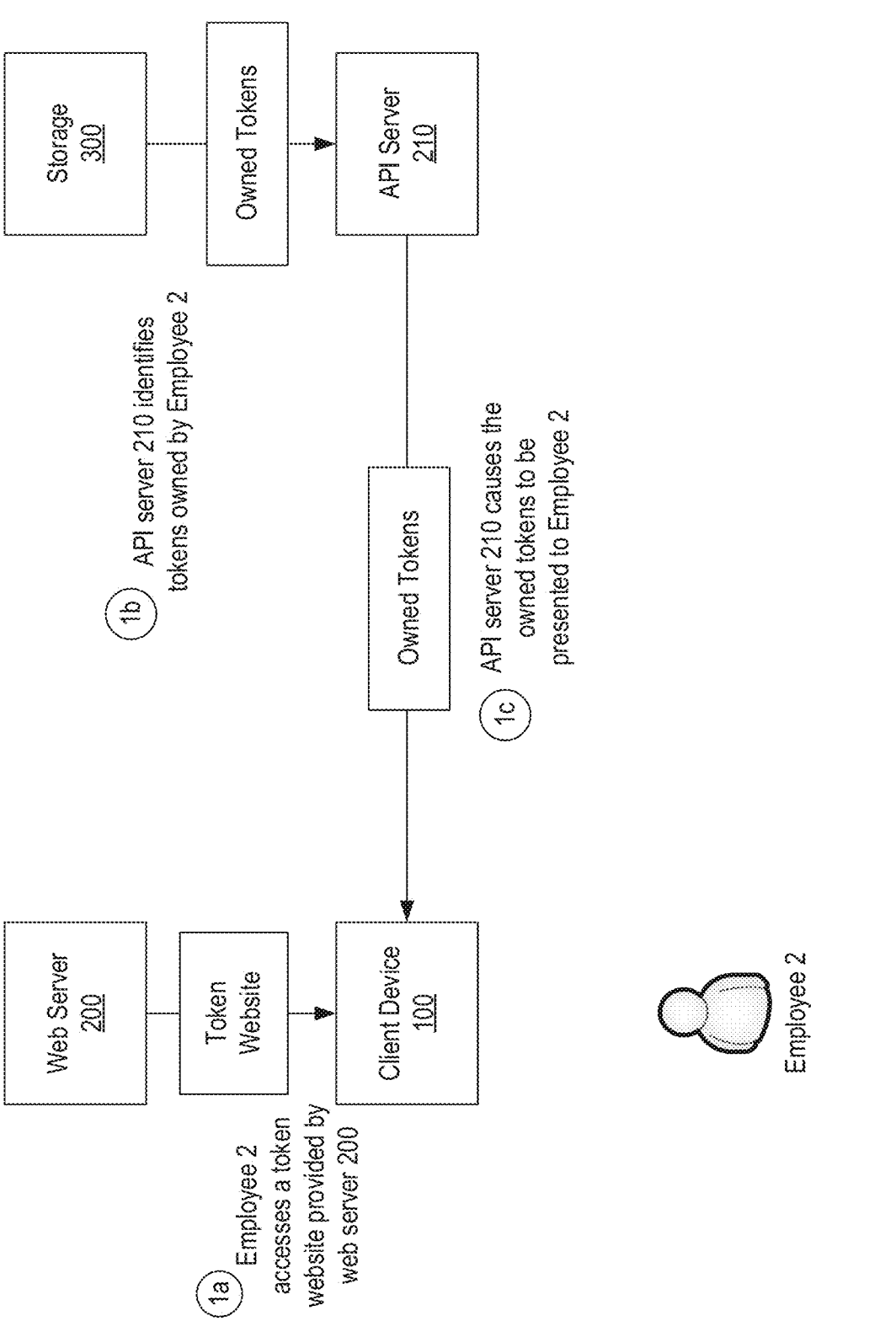
FIGS. 6A-6E provide an example of how a system may enable a user to withdraw a token to receive cryptocurrency in accordance with one or more embodiments of the present invention.

FIGS. 6A-6E provide an example of how system 10 can enable a user to withdraw a token. Turning to FIG. 6A, it is assumed, in step 1*a*, that Employee 2 accesses the token website. In a similar manner as described above, API server 210 may identify tokens that Employee 2 owns in step 1*b* and may cause these tokens to be presented to Employee 2 is step 1*c*. API server 210 could also cause tokens that Employee 2 can distribute to be presented.

Figure 6B:
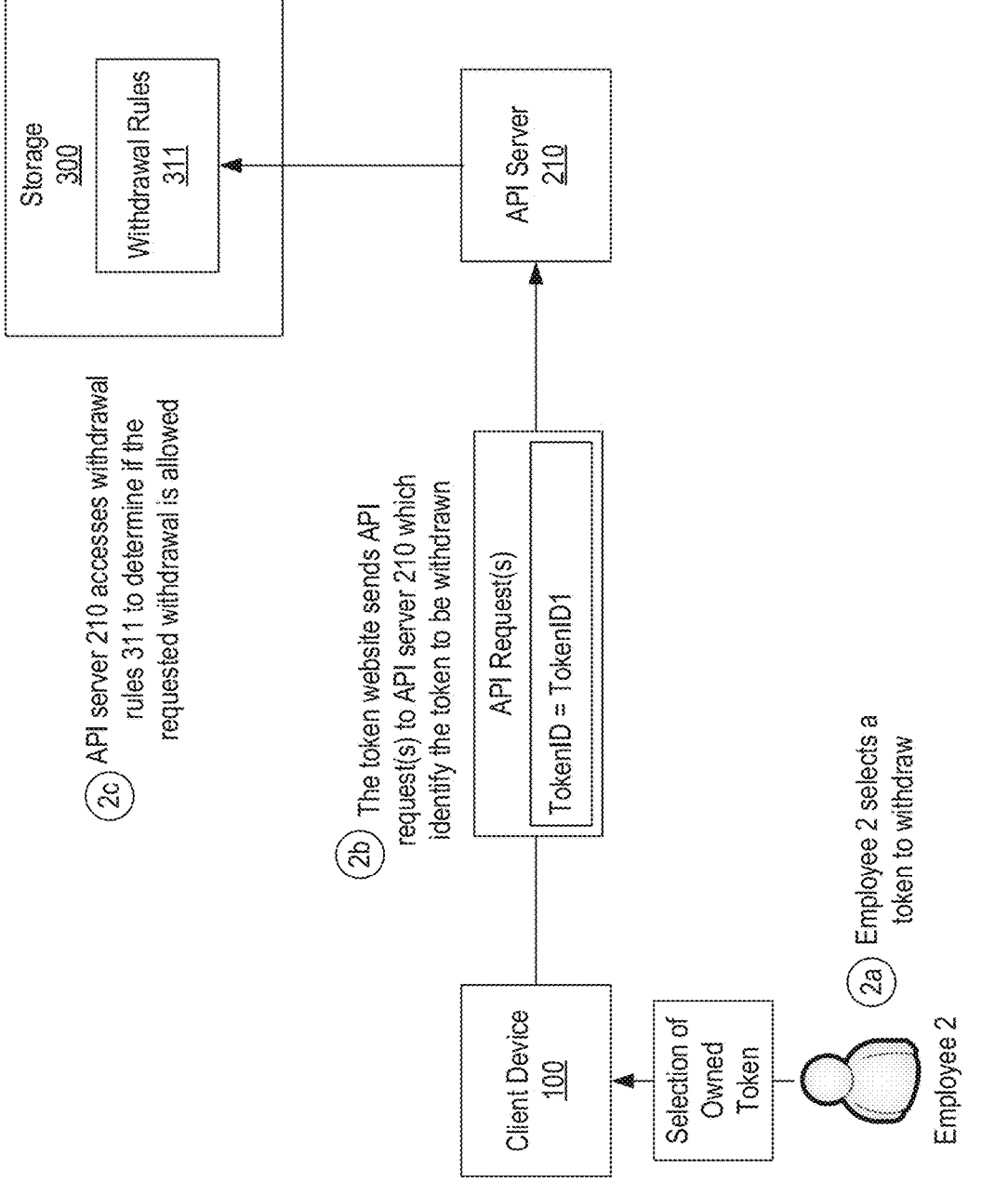

Turning to FIG. 6B, in step 2*a*, Employee 2 can select a token to withdraw. For example, the token website may provide an option for a user to select an owned token and request that the token be withdrawn. In step 2*b*, the token website can send one or more API requests to API server 210 which can identify the selected token that Employee 2 would like to withdraw, which in this example is assumed to be the token with a tokenID of TokenID1. In step 2*c*, API server 210 may access withdrawal rules 311 to determine if the requested withdrawal is allowed. For example, using the tokenID, API server 210 could determine the batchID of the batch to which the token pertains and then identify any withdrawal rule that is associated with the batch. Determining whether the requested withdrawal is allowed could entail determining whether the withdrawal is being requested within the time frame defined in the applicable withdrawal rule.

Figure 6C:
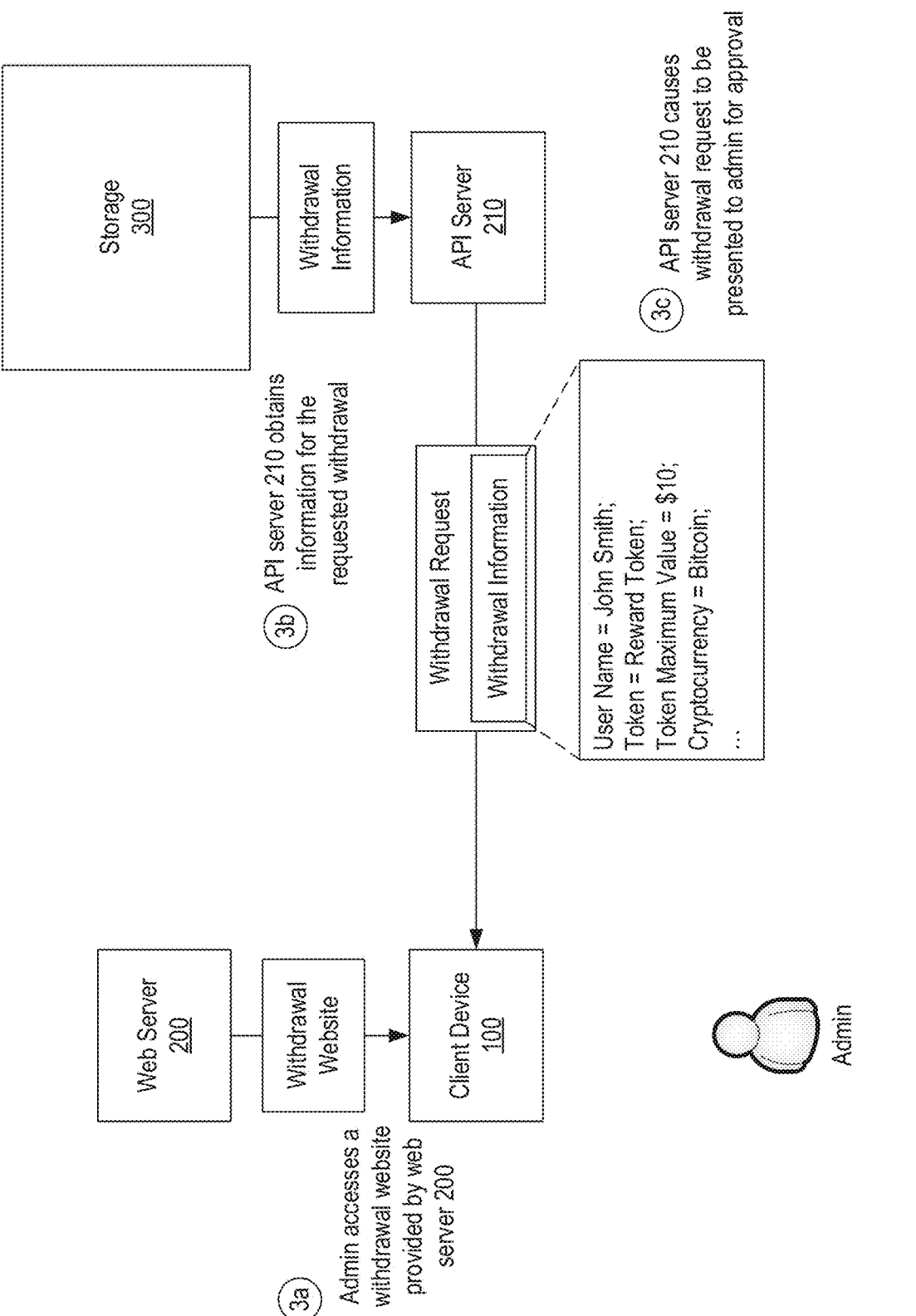

Turning to FIG. 6C, it is assumed that an admin accesses a withdrawal web site in step 3*a*. It is also assumed that API server 210 determined that the requested withdrawal is allowed. In step 3*b*, API server 210 may obtain information for the requested withdrawal (and possibly any other withdrawals that have been requested). Then, in step 3*c*, API server 210 can cause a withdrawal request to be presented to an admin to allow the admin to allow or deny the withdrawal. For example, the withdrawal website may allow the admin to review any withdrawals that an organization's employees have requested. In some embodiments, the withdrawal information that may be obtained and presented to the admin can include the name of the employee, a name of the token to be withdrawn, the maximum token value, the cryptocurrency with which the token is associated, etc.

Figure 6D:
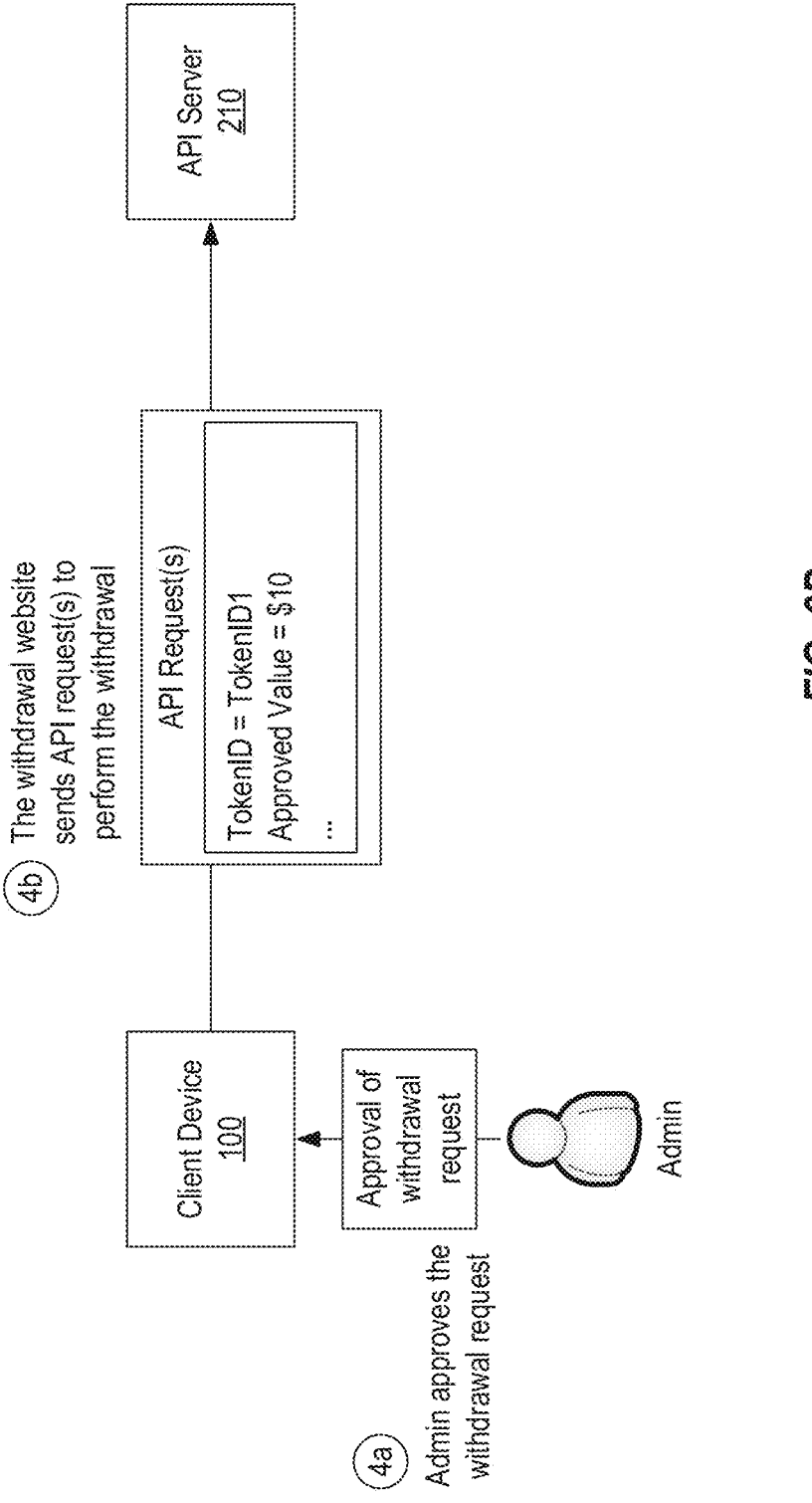

Turning to FIG. 6D, in step 4*a*, the admin can provide input to client device 100 to approve or deny the withdrawal request. In some embodiments, as part of approving the withdrawal request, the admin may define the approved value to be withdrawn which may be up to the defined maximum value for the token. For example, with the depicted token, the admin may be enabled to approve withdrawal of the token for up to $10 in Bitcoin. In step 4*b*, and in response to the admin's approval of the withdrawal request, the withdrawal website can send one or more API requests to API server 210 which identify the token that is approved to be withdrawn and, in some embodiments, may identify the approved value for the withdrawal.

Figure 6E:
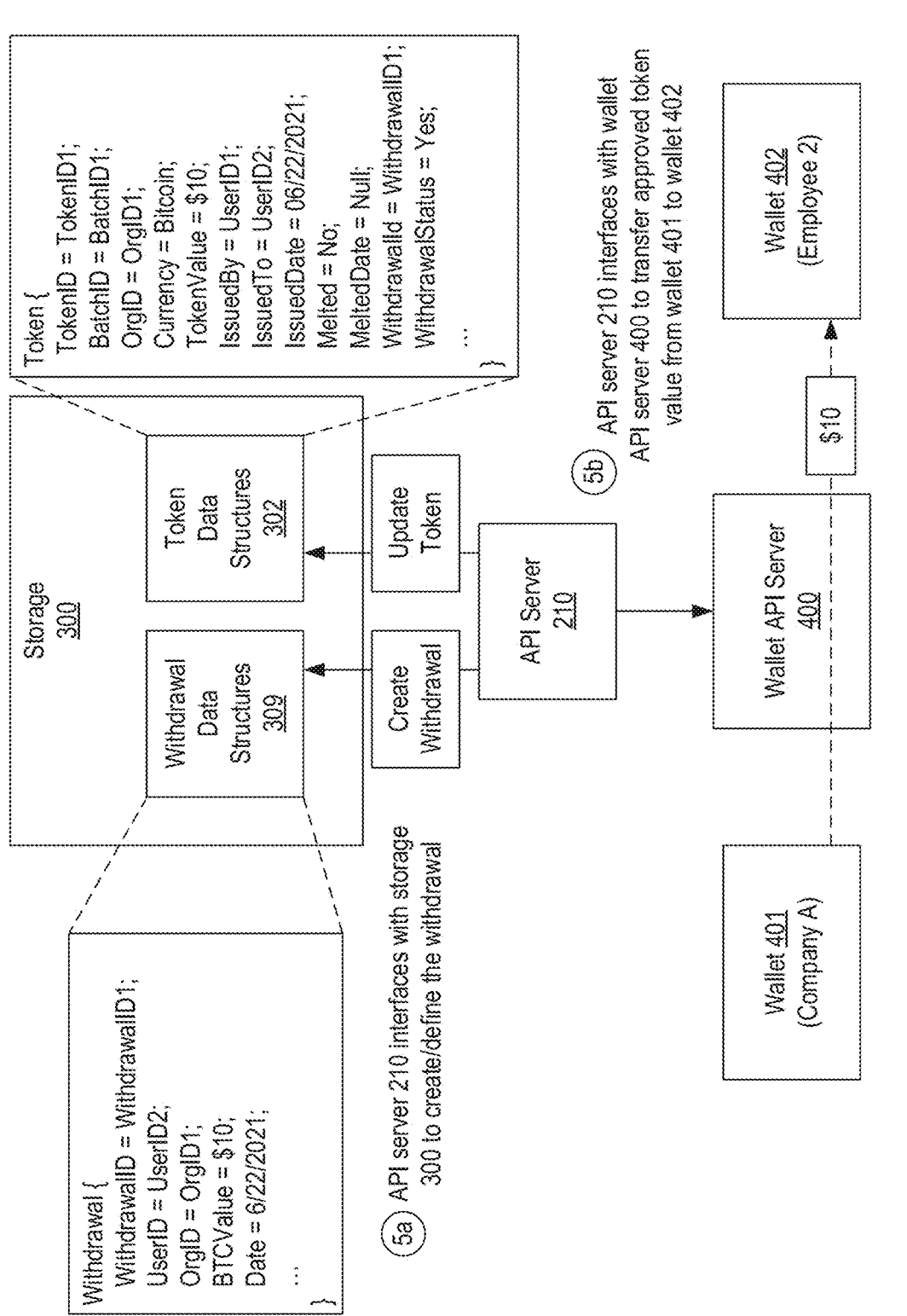

Turning to FIG. 6E, in step 5*a*, API server 210 can interface with storage 300 to create/define the withdrawal of the token. For example, API server 210 may create an entry in withdrawal data structures 309 that defines a withdrawalID which uniquely identifies the withdrawal of the token, an identifier of the employee that withdrew the token, the organization with which the withdrawing employee is associated, the value of the withdrawal, the date of the withdrawal, etc. Also, API server 210 may update token data structure 302 to include the withdrawalID and define the withdrawal status. In step 5*b*, API server 210 may interface with wallet API server 400 to cause the value of the withdrawal ($10) to be withdrawn form wallet 401 and deposited into wallet 402, which is assumed to be Employee 2's cryptocurrency wallet that he or she has registered with system 10.

By maintaining withdrawal data structures 309, system 10 enables an organization to quickly audit cryptocurrency transactions that it has made with its employees. For example, by querying withdrawal data structures 309 for a particular userID, the organization could determine the value and date of any cryptocurrency transaction the organization has had with a particular employee. Similarly, by querying withdrawal data structures 309 for its OrgID and a particular date range, the organization could quickly identify all cryptocurrency transactions it has made during the particular date range. Notably, because the issuance of tokens does not guarantee the receipt of currency, accounting for tax purposes can be performed based on the withdrawal rather than distribution of tokens.

In some cases, an organization may desire to melt tokens that have not been withdrawn, or in other words, to prevent the issuance or withdrawal of tokens. Therefore, in some embodiments, web server 200 may provide a mechanism by which an admin can request that a specified number of non-issued and/or non-withdrawn tokens in a batch be melted. For example, if 25 of the 50 minted tokens in the batch having the batchID of BatchID1 (see FIG. 4B) have been issued and the admin desires to prevent the remaining 25 minted tokens from being issued, the admin may cause one or more API requests to be submitted to API server 210 which can identify the batch and specify that 25 tokens should be melted. In response, API server 210 may access batch data structures 301 to determine whether 25 tokens are available to be melted, and if so, can update the MeltedTokens field to define that 25 tokens have been melted. When tokens are melted, their value can be freed up in the organization's underlying cryptocurrency balance. For example, after melting 25 tokens in BatchID1, the organization may have $250 in available cryptocurrency that it can use to mint a new batch of tokens.

In summary, a system configured in accordance with embodiments of the present invention enables an organization to create off-chain tokens that are backed by decentralized cryptocurrencies. As the organization's employees issue and receive the tokens, the system can maintain data structures that facilitate managing and auditing the tokens including the withdrawal of the tokens in exchange for cryptocurrency.

As can be seen, a system for off-chain management, distribution and auditing of decentralized cryptocurrency configured in accordance with one or more embodiments of the present invention can improve and enhance blockchain systems and their use in providing cryptocurrencies. A system for off-chain management, distribution and auditing of decentralized cryptocurrency configured in accordance with one or more embodiments of the present invention can enable organizations to integrate their existing systems with blockchain systems to facilitate the distribution of cryptocurrency to its employees in a streamlined and efficient manner.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a system that is separate from a cryptocurrency system, for off-chain management, distribution and auditing of decentralized cryptocurrency, the method comprising:

receiving, by an application programming interface (API) server of the system, a request to create an organization data structure in the system for an organization, the request to create the organization data structure identifying a cryptocurrency that the organization would like to use to create off-chain tokens within the system;

creating, by the API server, an organization data structure that defines the organization in the system;

interfacing, by the API server, with a wallet API server of the cryptocurrency system to create a cryptocurrency wallet in the cryptocurrency system for the organization;

storing, by the API server, an address of the cryptocurrency wallet in the organization data structure;

receiving, by the API server, a request to create a batch of off-chain tokens in the system for the organization, the request to create the batch of off-chain tokens identifying a number of the off-chain tokens in the batch and a value of each of the off-chain tokens in the batch;

using, by the API server and via the wallet API server, the address of the cryptocurrency wallet stored in the organization data structure to access the cryptocurrency wallet in the cryptocurrency system to determine whether the cryptocurrency wallet stores sufficient cryptocurrency for a total value of the off-chain tokens in the batch;

in response to determining via the wallet API server that the cryptocurrency wallet stores sufficient cryptocurrency for the total value of the off-chain tokens in the batch, creating, by the API server, the batch of off-chain tokens in the system, wherein creating the batch of off-chain tokens in the system includes creating or updating one or more batch data structures in the system to associate the value of the off-chain tokens in the batch with the cryptocurrency for the organization that is stored in the cryptocurrency wallet such that the off-chain tokens in the batch are defined in the system separately from and independent of the cryptocurrency in the cryptocurrency wallet in the cryptocurrency system;

in conjunction with creating the batch of off-chain tokens in the system, creating or updating, by the API server, one or more token issuer data structures in the system to define one or more token issuers for the batch of off-chain tokens;

receiving, by the API server, a request from a first employee of the organization to issue an off-chain token within the system;

in response to the request from the first employee, accessing, by the API server, the one or more token issuer data structures to determine that the first employee is defined in the system as a token issuer for the batch of off-chain tokens;

in response to determining that the first employee is defined in the system as a token issuer for the batch of off-chain tokens, presenting, to the first employee and via a client device of the first employee, an option to issue within the system and independent of the cryptocurrency in the cryptocurrency wallet an off-chain token from the batch of off-chain tokens to another employee;

receiving, by the API server, a request for a second employee of the organization to receive an off-chain token within the system and independent of the cryptocurrency in the cryptocurrency wallet;

in response to the request from the second employee, generating, by the API server, a code by which the second employee may receive an off-chain token within the system and independent of the cryptocurrency in the cryptocurrency wallet;

presenting, to the second employee and via a client device of the second employee, the code to thereby allow the second employee to use the client device of the second employee to share the code with the first employee via the client device of the first employee;

after the second employee uses the client device of the second employee to share the code with the first employee via the client device of the first employee, receiving, by the API server, the code from the client device of the first employee;

in response to receiving the code presented to the second employee from the client device of the first employee, issuing, within the system, the off-chain token from the batch of off-chain tokens to the second employee such that the off-chain token is issued within the system independently of the cryptocurrency stored in the cryptocurrency wallet in the cryptocurrency system;

receiving, by the API server, a request from the second employee to withdraw the first off-chain token in the system;

accessing, by the API server, withdrawal rules associated with the batch of off-chain tokens to determine whether the second employee is allowed to withdraw the first off-chain token in the system;

in conjunction with determining that the second employee is allowed to withdraw the first off-chain token in the system, using, by the API server and via the wallet API server, the address of the cryptocurrency wallet stored in the organization data structure to access the cryptocurrency wallet to withdraw the value of the first off-chain token from the cryptocurrency wallet; and using, by the API server and via the wallet API server, an address of a cryptocurrency wallet of the second employee to deposit the value of the first off-chain token in the cryptocurrency wallet of the second employee.

2. The method of claim 1, further comprising:

determining that the organization has created one or more other batches of off-chain tokens;

wherein determining that the cryptocurrency wallet stores sufficient cryptocurrency for the total value of the off-chain tokens in the batch includes determining that the cryptocurrency wallet stores sufficient cryptocurrency for the total value of the off-chain tokens in the batch and the total value of the off-chain tokens in the one or more other batches.

3. The method of claim 1, wherein the request to create the batch of off-chain tokens for the organization identifies a number of the off-chain tokens in the batch that the first employee may issue;

wherein creating or updating, by the API server, the one or more token issuer data structures in the system to define one or more token issuers for the batch of off-chain tokens comprises defining the number of the off-chain tokens in the batch that the first employee may issue.

4. The method of claim 1, wherein the request to create the batch of off-chain tokens for the organization identifies one or more employees of the organization that may receive the off-chain tokens in the batch, the method further comprising:

in conjunction with creating the batch of off-chain tokens in the system, creating or updating, by the API server, one or more token receiver data structures in the system to define one or more token receivers for the batch of off-chain tokens, the one or more token receivers corresponding with the one or more employees identified in the request to create the batch of off-chain tokens for the organization.

5. The method of claim 4, wherein the request to create the batch of off-chain tokens in the system for the organization identifies a number of the off-chain tokens in the batch that the one or more employees may receive;

wherein creating or updating, by the API server, the one or more token receiver data structures in the system to define one or more token receivers for the batch of off-chain tokens includes defining the number of the off-chain tokens in the batch that the one or more employees may receive.

6. The method of claim 1, wherein the request to create the batch of off-chain tokens in the system for the organization identifies an image for the off-chain tokens in the batch;

wherein creating the batch of off-chain tokens in the system includes creating a 3D digital representation for the off-chain tokens in the batch, the 3D digital representation including the image.

7. The method of claim 1, further comprising:

in response to the request from the first employee and before presenting the option to issue the off-chain token within the system, accessing distribution rules associated with the batch of off-chain tokens to determine whether the first employee is allowed to issue the first off-chain token to the second employee within the system.

8. The method of claim 1, further comprising:

modifying one or more data structures in the system to define that the value of the first off-chain token was withdrawn by the second employee.

9. The method of claim 1, wherein the request to create the batch of off-chain tokens in the system for the organization identifies a rarity of the off-chain tokens in the batch.

10. The method of claim 1, further comprising:

receiving a request to melt one or more off-chain tokens in the batch of off-chain tokens; and modifying the one or more batch data structures to define that the one or more off-chain tokens have been melted in the system.

11. One or more computer storage media storing computer executable instructions which when executed on a system that is separate from a cryptocurrency system implement a method for off-chain management, distribution and auditing of decentralized cryptocurrency, the method comprising:

receiving, by an application programming interface (API) server of the system, a request to create an organization data structure in the system for an organization, the request to create the organization data structure identifying a cryptocurrency that the organization would like to use to create off-chain tokens within the system;

creating, by the API server, an organization data structure that defines the organization in the system;

interfacing, by the API server, with a wallet API server of the cryptocurrency system to create a cryptocurrency wallet in the cryptocurrency system for the organization;

storing, by the API server, an address of the cryptocurrency wallet in the organization data structure;

receiving, by the API server, a request to create a batch of off-chain tokens in the system for the organization, the request to create the batch of off-chain tokens identifying a number of the off-chain tokens in the batch and a value of each of the off-chain tokens in the batch;

using, by the API server and via the wallet API server, the address of the cryptocurrency wallet stored in the organization data structure to access the cryptocurrency wallet in the cryptocurrency system to determine whether the cryptocurrency wallet stores sufficient cryptocurrency for a total value of the off-chain tokens in the batch;

in response to determining via the wallet API server that the cryptocurrency wallet stores sufficient cryptocurrency for the total value of the off-chain tokens in the batch, creating, by the API server, the batch of off-chain tokens in the system, wherein creating the batch of off-chain tokens in the system includes creating or updating one or more batch data structures in the system to associate the value of the off-chain tokens in the batch with the cryptocurrency for the organization that is stored in the cryptocurrency wallet such that the off-chain tokens in the batch are defined in the system separately from and independent of the cryptocurrency in the cryptocurrency wallet in the cryptocurrency system;

in conjunction with creating the batch of off-chain tokens in the system, creating or updating, by the API server, one or more token issuer data structures in the system to define one or more token issuers for the batch of off-chain tokens;

receiving, by the API server, a request from a first employee of the organization to issue an off-chain token within the system;

in response to the request from the first employee, accessing, by the API server, the one or more token issuer data structures to determine that the first employee is defined in the system as a token issuer for the batch of off-chain tokens;

in response to determining that the first employee is defined in the system as a token issuer for the batch of off-chain tokens, presenting, to the first employee and via a client device of the first employee, an option to issue within the system and independent of the cryptocurrency in the cryptocurrency wallet an off-chain token from the batch of off-chain tokens to another employee;

receiving, by the API server, a request for a second employee of the organization to receive an off-chain token within the system and independent of the cryptocurrency in the cryptocurrency wallet;

in response to the request from the second employee, generating, by the API server, a code by which the second employee may receive an off-chain token within the system and independent of the cryptocurrency in the cryptocurrency wallet;

presenting, to the second employee and via a client device of the second employee, the code to thereby allow the second employee to use the client device of the second employee to share the code with the first employee via the client device of the first employee;

after the second employee uses the client device of the second employee to share the code with the first employee via the client device of the first employee, receiving, by the API server, the code from the client device of the first employee;

in response to receiving the code presented to the second employee from the client device of the first employee, issuing, within the system, the off-chain token from the batch of off-chain tokens to the second employee such that the off-chain token is issued within the system independently of the cryptocurrency stored in the cryptocurrency wallet in the cryptocurrency system;

receiving, by the API server, a request from the second employee to withdraw the first off-chain token in the system;

accessing, by the API server, withdrawal rules associated with the batch of off-chain tokens to determine whether the second employee is allowed to withdraw the first off-chain token in the system;

in conjunction with determining that the second employee is allowed to withdraw the first off-chain token in the system, using, by the API server and via the wallet API server, the address of the cryptocurrency wallet stored in the organization data structure to access the cryptocurrency wallet to withdraw the value of the first off-chain token from the cryptocurrency wallet; and using, by the API server and via the wallet API server, an address of a cryptocurrency wallet of the second employee to deposit the value of the first off-chain token in the cryptocurrency wallet of the second employee.

12. The computer storage media of claim 11, wherein the method further comprises:

determining that the organization has created one or more other batches of off-chain tokens;

wherein determining that the cryptocurrency wallet stores sufficient cryptocurrency for the total value of the off-chain tokens in the batch includes determining that the cryptocurrency wallet stores sufficient cryptocurrency for the total value of the off-chain tokens in the batch and the total value of the off-chain tokens in the one or more other batches.

13. The computer storage media of claim 11, wherein the request to create the batch of off-chain tokens for the organization identifies a number of the off-chain tokens in the batch that the first employee may issue;

wherein creating or updating, by the API server, the one or more token issuer data structures in the system to define one or more token issuers for the batch of off-chain tokens comprises defining the number of the off-chain tokens in the batch that the first employee may issue.

14. The computer storage media of claim 11, wherein the request to create the batch of off-chain tokens for the organization identifies one or more employees of the organization that may receive the off-chain tokens in the batch, the method further comprising:

in conjunction with creating the batch of off-chain tokens in the system, creating or updating, by the API server, one or more token receiver data structures in the system to define one or more token receivers for the batch of off-chain tokens, the one or more token receivers corresponding with the one or more employees identified in the request to create the batch of off-chain tokens for the organization.

15. The computer storage media of claim 14, wherein the request to create the batch of off-chain tokens in the system for the organization identifies a number of the off-chain tokens in the batch that the one or more employees may receive;

wherein creating or updating, by the API server, the one or more token receiver data structures in the system to define one or more token receivers for the batch of off-chain tokens includes defining the number of the off-chain tokens in the batch that the one or more employees may receive.

16. The computer storage media of claim 11, wherein the request to create the batch of off-chain tokens in the system for the organization identifies an image for the off-chain tokens in the batch;

wherein creating the batch of off-chain tokens in the system includes creating a 3D digital representation for the off-chain tokens in the batch, the 3D digital representation including the image.

17. The computer storage media of claim 11, wherein the method further comprises:

in response to the request from the first employee and before presenting the option to issue the off-chain token within the system, accessing distribution rules associated with the batch of off-chain tokens to determine whether the first employee is allowed to issue the first off-chain token to the second employee within the system.

18. The computer storage media of claim 11, wherein the method further comprises:

modifying one or more data structures in the system to define that the value of the first off-chain token was withdrawn by the second employee.

19. The computer storage media of claim 11, wherein the request to create the batch of off-chain tokens in the system for the organization identifies a rarity of the off-chain tokens in the batch.

20. The computer storage media of claim 11, wherein the method further comprises:

receiving a request to melt one or more off-chain tokens in the batch of off-chain tokens; and modifying the one or more batch data structures to define that the one or more off-chain tokens have been melted in the system.

* * * * *